(12) United States Patent
Baek et al.

(10) Patent No.: US 6,444,299 B1
(45) Date of Patent: Sep. 3, 2002

(54) BIAXIALLY ORIENTED POLYESTER FILM WITH IMPROVED DYEABILITY

(75) Inventors: Sanghyun Baek; Gisang Song, both of Kumi (KR)

(73) Assignee: Kolon Industries, Inc., Kwachon (KR)

( * ) Notice: Subject to any disclaimer, the term of this patent is extended or adjusted under 35 U.S.C. 154(b) by 0 days.

(21) Appl. No.: 09/714,825

(22) Filed: Nov. 17, 2000

(30) Foreign Application Priority Data

Dec. 3, 1999 (KR) .............................. 99-54682
Sep. 20, 2000 (KR) ........................ 2000-55095

(51) Int. Cl.$^7$ .............................................. C08L 67/02
(52) U.S. Cl. ....................................... 428/219; 525/444
(58) Field of Search ......................... 525/444; 428/219

(56) References Cited

U.S. PATENT DOCUMENTS

| | | | |
|---|---|---|---|
| 3,932,121 A | 1/1976 | Kawakami et al. | 8/21 C |
| 3,937,755 A | 2/1976 | Hahn et al. | 260/860 |
| 3,988,387 A | 10/1976 | Chimura et al. | 260/860 |
| 4,377,682 A | 3/1983 | Ohguchi et al. | 528/301 |
| 4,403,094 A | 9/1983 | Sasaki et al. | 528/308 |
| 4,835,053 A | 5/1989 | Stanko | 428/364 |
| 5,916,677 A | 6/1999 | Chen et al. | 428/364 |
| 6,187,900 B1 | 2/2001 | Tseng et al. | 528/364 |

FOREIGN PATENT DOCUMENTS

| | | | |
|---|---|---|---|
| EP | 0372994 A2 | 6/1990 | D01F/6/84 |
| EP | 0570227 A2 | 11/1993 | D01F/6/92 |
| GB | 1063317 | 3/1967 | C08G/39/04 |
| GB | 1073067 | 6/1967 | |
| GB | 1458561 | 12/1976 | |
| GB | 1517567 | 7/1978 | |
| JP | 53-50257 | * 5/1978 | |
| JP | 55040876 | 3/1980 | D01F/6/62 |
| JP | 57139523 | 8/1982 | D01F/8/14 |
| JP | 58214523 | 12/1983 | |
| JP | 58220812 | 12/1983 | D01F/6/62 |
| JP | 59125906 | 7/1984 | |
| JP | 4057916 | 2/1992 | D01F/6/84 |
| JP | 4057917 | 2/1992 | D01F/6/86 |
| JP | 4065518 | 3/1992 | D01F/6/84 |
| JP | 8003429 | 1/1996 | C08L/67/02 |

* cited by examiner

Primary Examiner—Patricia A. Short
(74) Attorney, Agent, or Firm—Shanks & Herbert

(57) ABSTRACT

A biaxially oriented polyester film with improved dyeability is prepared by meltblending 55 to 90 wt. % of polyethylene terephthalate and 10 to 45 wt. % of polytrimethylene terephthalate.

4 Claims, 1 Drawing Sheet

BIAXIALLY ORIENTED POLYESTER FILM WITH IMPROVED DYEABILITY

BACKGROUND OF THE INVENTION

The present invention generally relates to a biaxially oriented polyester film with improved dyeability, and more particularly, to a polyester film excellent in dyeability which is prepared by melt-blending polyethylene terephthalate with polytrimethylene terephthalate.

DESCRIPTION OF THE RELATED ART

Polyethylene terephthalate molded materials have been widely used in various industrial fields as a plastic material for fiber, film and the like. Among the molded articles, polyethylene terephthalate films composed of aromatic dicarboxylic acids and glycols have excellent mechanical properties including heat resistance, tensile strength, Young's modulus, elastic recovery and impact resistance, dimensional stability and electrical insulating strength, and are being broadly used in a number of agricultural and industrial applications such as magnetic recording tape, photographic film, insulating material and base film of coating application. Besides, polyethylene terephthalate films are being frequently utilized in food and consumer packaging applications due to their excellent chemical properties including chemical resistance, weather resistance and water resistance, transparency, flavor retentivity, gas barrier property.

Typically, an industrial process for producing polyethylene terephthalate films is carried out in a known manner, for example, by melt-extruding a polyethylene terephthalate polymer, cooling the extruded polymer in a cooling drum to obtain an amorphous sheet, and stretching and heat setting the amorphous sheet into a biaxially oriented film.

An industrial process for producing the polyethylene terephthalate polymer used to produce polyethylene terephthalate films includes a direct esterification reaction in which dicarboxylic acids including mainly terephthalic acid are esterified with ethylene glycols at a temperature of 200 to 280° C. under atmosphere or vacuum, or an ester interchange reaction (i.e., transesterification) in which dimethylcarboxylates including mainly dimethyl terephthalate are transesterified with glycols including mainly ethylene glycol in the presence of a transesterification catalyst at 140 to 240° C., thereby obtaining bis($\beta$-hydroxyethyl)terephthalates and low-molecular condensates thereof (i.e., esterified products); and a polycondensation stage in which the esterified products obtained in the direct esterification or transesterification stage are subjected to polycondensation in the presence of a polycondensation catalyst with heating at 260 to 300° C. under high vacuum.

Polyethylene terephthalate is known to be of great value in the industrial aspect due to its excellent properties as described above. Nonetheless, polyethylene terephthalate is limited in application because it has few active functional groups in the molecular. For example, polyethylene terephthalate is thus inferior in adhesiveness, dyeability, and moisture-absorbing and antistatic properties to other polymers, namely, polyamides, acetates and celluloses.

In an attempt to improve such poor properties of polyethylene terephthalate, especially, dyeability, there are suggested several conventional methods including, for example, (1) adding a copolymer component to the aromatic polyethylene terephthalate decrease the crystallinity and increase the dispersability of the dye, or (2) adding a compound having an affinity to the dye to strengthen the bonding with the dye.

However, those conventional methods are not so much effective and rather disadvantageous in that the polyethylene terephthalate copolymers decrease the softening temperature of polyethylene terephthalate and causes discoloration or nonuniformity of the mixture, thereby deteriorating all or some of the above-mentioned excellent mechanical, physical or chemical properties of the polyethylene terephthalate.

In view of the above problem, several methods have been suggested to improve the dyeability of polyethylene terephthalate without addition of some copolymer components.

A first method is to use a dye having a relatively small size of molecules, which dye is poor in bonding into the polyethylene terephthalate film in washing. Another method involves adding carriers to the aqueous dye bath with a rise of production cost. In the third method, the formed articles are pretreated with a semi-solvent to have a double-layered (sheath-core) structure, the outer layer of which is more susceptible to dyeing and provides ununiformed dyeing to thickness of film. Besides, a solution dyeing method has been proposed in which the final products(In case of fiber is texture) are dyed with a melt blend of the dye and the polyethylene terephthalate polymer. The solution dyeing method may be effective in dyeing but actually is inapplicable to a multiproduct process on a small scale.

SUMMARY OF THE INVENTION

It is an object of the present invention to solve the problem with the dyeability of a polyethylene terephthalate and to provide a polyethylene terephthalate film with improved dyeability that is prepared by blending polytrimethylene terephthalate with a polymer of polyethylene terephthalate alone without addition of some copolymer component.

To achieve the object of the invention, there is provided a biaxially oriented film prepared by melt-blending 55 to 90 wt. % of polyethylene terephthalate with 10 to 45 wt. % of polytrimethylene terephthalate.

DETAILED DESCRIPTION OF THE INVENTION

Figure 1:
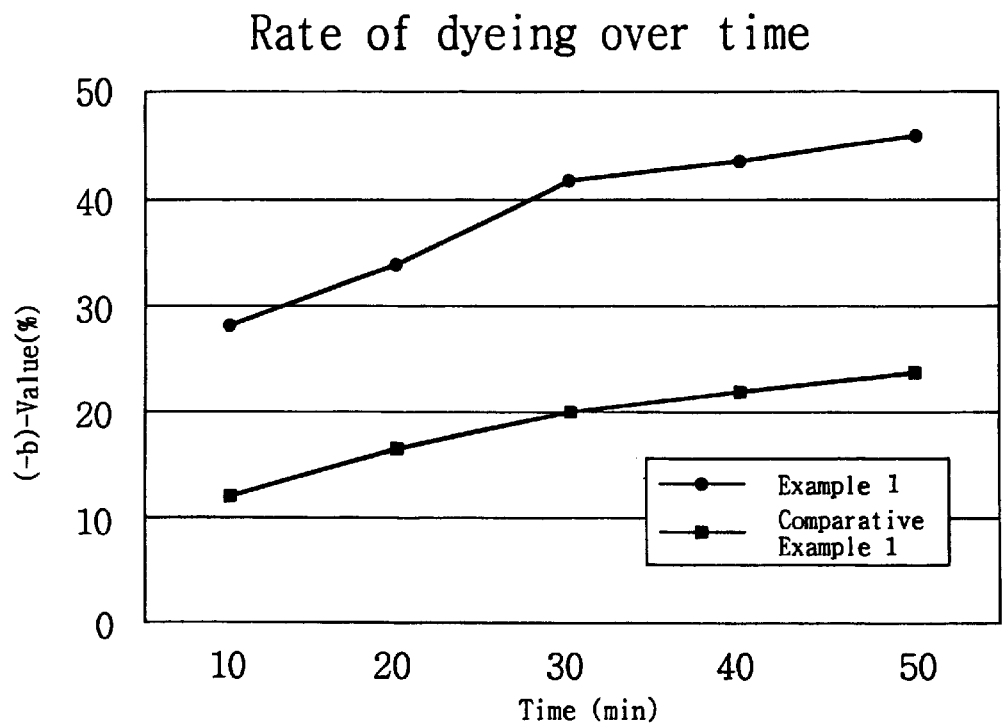
FIG. 1 is a graph plotting the rate of dyeing over time on films prepared according Example 1 and Comparative Example 1.

A process for producing polytrimethylene terephthalate includes a polycondensation stage in which dicarboxylic acids including terephthalic acid are polycondensed with tethylene glycols. The polytrimethylene terephthalate thus prepared has the following characteristics in comparison to other conventional film materials as presented in Table 1.

TABLE 1

|  | A | B | C | D | E |
|---|---|---|---|---|---|
| Melting Point (° C.) | 220–225 | 255–260 | 220 | 265 | 168 |
| Glass Transition Temperature (° C.) | 45–65 | 80 | 40–60 | 50–90 | <17 |
| Density (g/cm$^3$) | 1.33 | 1.40 | 1.13 | 1.14 | 0.91 |
| Water Absorption (%) | 0.15 | 0.49 | 9.5 | 8.9 | <0.03 |

TABLE 1-continued

|  | A | B | C | D | E |
|---|---|---|---|---|---|
| Elastic Recovery | Good | Normal | Good | Good | Poor |
| Impact Resistance | Good | Good | Poor | Poor | Good |
| Dyeability | Good | Good | Good | Good | None |
| Dyeing Temperature (° C.) | 110 | 130 | 70–90 | — | — |
| Shrinkage (%) at 100° C. | 13.8 | 2.4 | 0.5 | — | — |

Note)
A: Polytrimethylene terephthalate
B: Polyethylene terephthalate
C: Nylon 6
D: Nylon 66
E: Polypropylene As shown in Table 1, polytrimethylene terephthalate is more dyeable than polyethylene terephthalate due to its low glass transition temperature and density, and exhibits a color intensity (K/S) more than five times as high as polyethylene terephthalate under the same dyeing condition. Such excellent properties allow the production of a polyester film having good dyeability from a blend of the polytrimethylene terephthalate with polyethylene terephthalate.

Even a small amount of polytrimethylene terephthalate can increase the rate of dyeing with the result of enhanced productivity. Also, because such a dyeing process using polytrimethylene terephthalate is simple, thin film can produce the cost of dyeing process.

The biaxially oriented film of this invention is obtained by melt-blending 55 to 90 wt. % of polyethylene terephthalate with 10 to 45 wt. % of polytrimethylene terephthalate.

Polytrimethylene terephthalate has a lower melt viscosity than polyethylene terephthalate under the same extrusion condition and thus forms a disperse phase with a great deterioration of the properties at the composition ratio of polyethylene terephthalate to polytrimethylene terephthalate being 50:50. It is therefore required to produce the film in the composition range that the polyethylene terephthalate forms a matrix.

The two polymers are of the same ester polymer family and expected to effectively form a homogeneous phase mixture.

Mixing two different polymers is normally ready to cause a phase separation with reduced transparency as well as melt fracture during an extrusion process.

This invention provides a uniform phase mixture of the two different components without a great deterioration of the transparency.

Compared to polyethylene terephthalate alone, a blend of polyethylene terephthalate and polytrimethylene terephthalate exhibits a higher haze by about 0.1 to 1.0. This variation of the haze is so negligible. The mixture is homogeneous phase.

Nevertheless, in this invention, the processing temperature was raised to 280 to 295° C. higher than that of the normal process for preparing polyethylene terephthalate by about 5 to 15° C. in order to guarantee uniform dispersion of the polymers and thereby prevent the dyeing difference. The invention also increased the dimensional stability with a relaxation of more than 6% to control the high shrinkage of the polytrimethylene terephthalate in the stretching process.

This film obtained in a heated-air oven at 200° C. for 10 minutes had a heat shrinkage of less than 6.0% in the mechanical direction and less than 3.0% in the transverse direction.

Hereinafter, this invention will be described in detail by way of examples, which are not intended to limit the scope of the invention.

The films prepared in the following examples and comparative examples were evaluated for properties according to the following procedures:

(1) Tensile Strength

The tensile strength was determined according to ASTM D 882 with an Instron 1123 (model name) under a condition of an elongation rate of 300 mm/min, a distance between grips of 100 mm, a temperature of 20° C., a relative humidity of 65% and a sample size of 10×100 mm (width× length).

(2) Density

The density was measured according to ASTM D 1507 by the density gradient column method using a density gradient column of n-heptane and carbon tetrachloride.

(3) Heat Shrinkage

After a heat treatment at 200° C. for 10 minutes in a free field, a dimensional change of the sample (size: 20×°cm in width×length) was measured. The heat shrinkage is calculated using the formula:

Heat shrinkage (%)=(dimensional (length) change/initial length)×100

(4) Dyeability

To evaluate the dyeability of the polyethylene terephthalate films, 0.1 wt. % of a disperse dye, Miketon FBL Blue (available from Mitsui Toastu, Japan) was uniformly dispersed in distilled water and the dye solution was heated to 90° C. Samples of the polyethylene terephthalate films were immersed in the dye solution for 30 minutes, washed out with distilled water and dried at the room temperature. The samples were then analyzed in regard to dyeability.

A. Chromaticity

The chromaticity was measured on a CR-200, chromoscope available from Minolta and classified into "L", "a" and "b", in which the term L indicates the lightness, the (+a)-value the red color tone, the (−a)-value the green color tone, the (+b)-value the yellow color tone, the (−b)-value the blue color tone. For the above dye, the dyeability becomes better in the order of increasing the (−b)-value.

B. Color Intensity (K/S)

The color intensity was determined on an SF600, computer color matching(CCM) commercially available from Data Color. The dyeability goes better with an increase in the color intensity.

(5) Thermal Analysis—Measurement of Melting Temperature

The thermal analysis was conducted on a DSC 7 available from Perkin Elmer. To measure the melting temperature, the temperature of the sample in the DSC was first heated from 0° C. to 280° C. at a rate of 20° C./min, held at 280° C. for 5 minutes and lowered to 0° C. at the same rate. After kept at 0° C. for 5 minutes, the temperature was second heated to 280° C. at a rate of 20° C./min.

EXAMPLES 1 to 3 AND COMPARATIVE EXAMPLES 1 to 3

Polyethylene terephthalate and polytrimethylene terephthalate were melt-blended with the compositions as presented in Table 2. The blend was extruded into an amorphous sheet, which was then stretched to 3.0 to 4.5 times from the original dimension in both mechanical and transverse directions and thermally set into films.

TABLE 2

| | Composition (PET/PTT) | Production Conditions | | | |
|---|---|---|---|---|---|
| | | MD Relaxation (%) | Extruder Temperature (°C.) | Drawing Temperature (°C.) | Heat-treatment Temperature (°C.) |
| Example 1 | 90/10 | 6 | 290 | 80–120 | 200–230 |
| Example 2 | 80/20 | 8 | 290 | 80–120 | 200–230 |
| Example 3 | 60/40 | 10 | 290 | 80–120 | 200–230 |
| Comparative Example 1 | 100/0 | 6 | 280 | 80–120 | 200–230 |
| Comparative Example 2 | 0/100 | 15 | 260 | 30–80 | 190–210 |
| Comparative Example 3 | Nylon 6 | 5 | 260 | 30–80 | 180–210 |

The Nylon 6 film is a biaxially oriented film of tubular type and the polyethylene terephthalate film is produced in a tenter type successive biaxial drawing machine.

Subsequently, the films prepared in Example 1 and Comparative Examples 1 and 3 were compared in regard to dyeability. The results are presented in Table 3.

TABLE 3

| | | Disperse Dye | |
|---|---|---|---|
| | | 80° C. | 90° C. |
| Example 1 | L | 85.50 | 65.10 |
| | a | −4.58 | −2.12 |
| | b | −13.61 | −41.77 |
| Comparative Example 1 | L | 92.10 | 80.90 |
| | a | −2.33 | −5.23 |
| | b | −4.03 | −19.82 |
| Comparative Example 3 | L | 51.81 | 39.78 |
| | a | 7.24 | 26.75 |
| | b | −57.24 | −66.09 |

As is apparent from Table 3, when using the disperse dye, Miketon FBL Blue at a temperature of 80 or 90° C. for 30 minutes, the sample of Example 1 comprising no more than 10% of polytrimethylene terephthalate had the (−b)-value more than twice as high as the sample of Comparative Example 1 comprising polyethylene terephthalate alone. Although inferior in dyeability to the sample of Comparative Example 3 comprising Nylon 6 alone, the sample of Example 1 was turned out more desirable because it has a low water absorption capacity and a high Young's modulus as well as lower production cost.

In addition, the films prepared in Examples 1 to 3 and Comparative Examples 1 to 3 were compared in regard to dyeability. The results are presented in Table 4.

TABLE 4

| | b-value | Color Intensity (K/S) |
|---|---|---|
| Example 1 | −41.77 | 5.10 |
| Example 2 | 49.21 | 20.64 |
| Example 3 | −60.03 | 36.18 |
| Comparative Example 1 | −19.82 | 0.73 |
| Comparative Example 2 | −62.53 | 82.39 |
| Comparative Example 3 | −66.09 | 83.47 |

Table 4 shows the measured "b-value" and color intensity of the individual sample prepared in Examples 1 to 3 and Comparative Examples 1 to 3 after 30 minutes of dyeing at 90° C. The (+b)-value indicates the yellow color tone and the (−b)-value indicates the blue color tone. A larger (−b)-value implies more excellence in dyeability under under the same time condition. For the samples 1 to 3, the increasing content of polytrimethylene terephthalate caused an increase in both (−b)-value and color intensity that indicates the color degree.

FIG. 1 shows a comparison between the films of Example 1 and Comparative Example 1 in terms of the dyeability over time.

As is apparent from the results of FIG. 1, the biaxially oriented film of Example 1 had an increase in the (−b)-value with increasing the dyeing time.

Also, the dyeability (i.e., b-value) of the film of Example 1 was evaluated on the basis of positions over the mechanical length of 5 m. The results are presented in FIG. 2.

Figure 2:
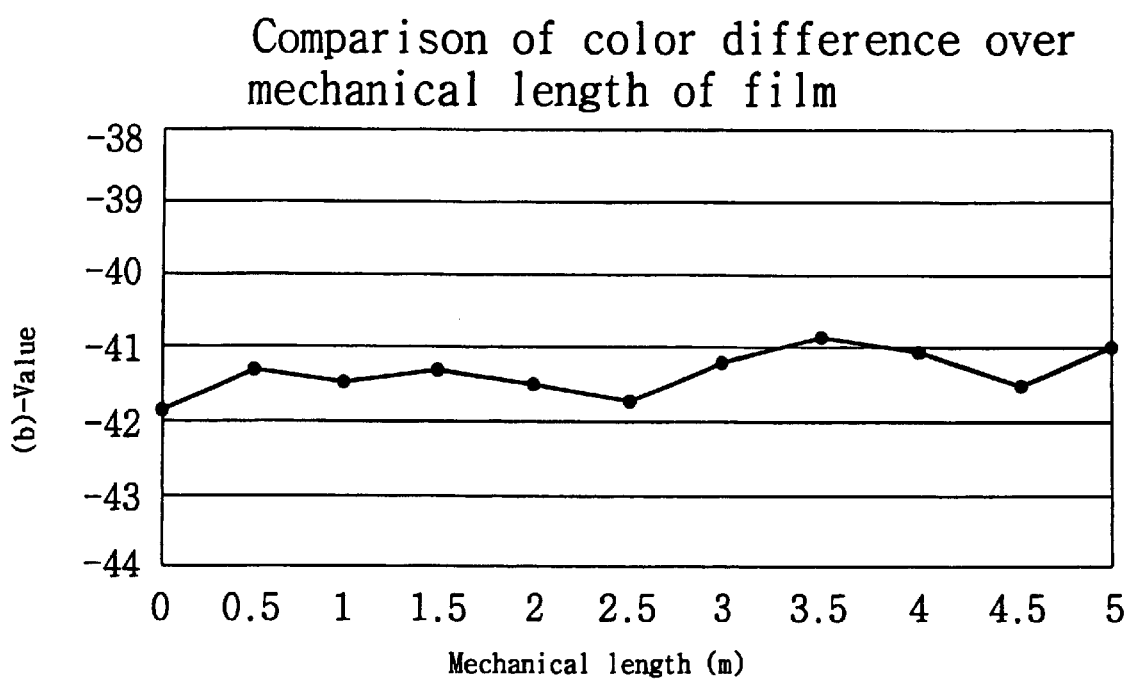
FIG. 2 is a graph plotting the dyeability color difference by position over the total width (5 m) of the film prepared according to Example 1.

It can be seen from FIG. 2 that a difference in the b-value between the maximum and minimum is 0.98. This implies that the film is very uniform in dyeability from the edge to the central portion. On the contrary, the dyed polyethylene terephthalate film generally shows a gradient that the rate of dyeing is decreasing from the edge to the central portion over the mechanical length of the film, with a deterioration of the uniformity in dyeability. This problem with the nonuniform dyeability confines the dyeing range of the polyethylene terephthalate film to the central portion. However, this invention provides a film with uniform dyeability in all positions over the mechanical length.

In regard to the uniformity of dyeability, the film according to the invention was superior to the film comprising polyethylene terephthalate alone. Thus advantageously, any portion of the film can be used irrespective of the position over the mechanical length.

According to this invention, films can be obtained in which the deviation of the b-value is less than ±2 under the same dyeing condition over the transverse length of the films.

The other properties of the biaxially oriented films prepared in Examples 1 to 3 and Comparative Examples 1 to 3 are presented in Table 5.

TABLE 5

| | Tensile Strength (kg/mm²) | | Heat Shrinkage (%) | | Density (g/cm³) |
|---|---|---|---|---|---|
| | MD | TD | MD | TD | |
| Example 1 | 28.7 | 23.5 | 4.2 | 0.8 | 1.3940 |
| Example 2 | 27.7 | 23.5 | 5.1 | 1.0 | 1.3879 |
| Example 3 | 27.5 | 23.1 | 5.8 | 1.3 | 1.3755 |
| Comparative Example 1 | 29.6 | 24.1 | 4.0 | 0.0 | 1.3968 |
| Comparative Example 2 | 26.3 | 24.0 | 8.9 | 4.3 | 1.3462 |
| Comparative Example 3 | 27.1 | 23.5 | — | — | 1.1479 |

As is apparent from the results of Table 5, the film prepared from polyethylene terephthalate alone according to Comparative Example 1 exhibits similar mechanical properties but is inferior in dyeability to the films of Examples 1 to 3.

On the other hand, the films were measured for melting point ($T_m$). The results are presented in Table 6.

TABLE 6

| | Composition (PET/PTT) | $T_m$ (° C.) of PET | $T_m$ (° C.) of PTT |
|---|---|---|---|
| Example 1 | 90/10 | 252.8 | — |
| Example 2 | 80/20 | 246.1 | — |
| Comparative Example 1 | 100/0 | 255.5 | — |
| Comparative Example 2 | 0/100 | — | 226.1 |

As seen from the results of Table 6, the melting point of polyethylene terephthalate (PET) decreased by about 6.7° C. with an increase of 10% in the content of polytrimethylene terephthalate (PTT) and the melting point of PTT did not appear. The melting point corresponds to the crystal region intrinsic to the polymer and is known not to change in the immiscible system of two distinct polymers. However, the above results shows that the PTT has presumably been dissolved in the crystal region of the PET to drop the melting point of the PET. This presumably results from uniform dispersion and ester interchange reaction of the two polymers and improves the uniformity of dyeing.

As described above, the biaxially oriented polyester film according to this present invention is useful for use purpose of dyeing, the polyester film being prepared by blending polytrimethylene terephthalate with a polymer of polyethylene terephthalate alone without addition of a separate copolymer component.

What is claimed is:

1. A biaxially oriented polyester film with improved dyeability being prepared by melt-blending 55 to 90 wt. % of polyethylene terephthalate and 10 to 45 wt. % of polytrimethylene terephthalate.

2. The biaxially oriented polyester film with improved dyeability as claimed in claim 1, wherein the film has an heat shrinkage of less than 6.0% in the mechanical direction and less than 3.0% in the transverse direction, measured after treating the polyester film at 200° C. for 10 minutes.

3. The biaxially oriented polyester film with improved dyeability as claimed in claim 1, wherein the film has a density in the range from 1.3700 to 1.400 g/cm$^3$.

4. The biaxially oriented polyester film with improved dyeability as claimed in claim 1, wherein the polyester film has a deviation of the b-value being less than ±2 over the transverse length thereof.

* * * * *